US009977637B2

(12) United States Patent
Ohshima

(10) Patent No.: US 9,977,637 B2
(45) Date of Patent: May 22, 2018

(54) IMAGE READING APPARATUS FOR READING IMAGES FORMED ON A SHEET

(71) Applicants: KABUSHIKI KAISHA TOSHIBA, Minato-ku, Tokyo (JP); TOSHIBA TEC KABUSHIKI KAISHA, Shinagawa-ku, Tokyo (JP)

(72) Inventor: Masami Ohshima, Shizuoka (JP)

(73) Assignees: KABUSHIKI KAISHA TOSHIBA, Tokyo (JP); TOSHIBA TEC KABUSHIKI KAISHA, Tokyo (JP)

( * ) Notice: Subject to any disclaimer, the term of this patent is extended or adjusted under 35 U.S.C. 154(b) by 0 days. days.

(21) Appl. No.: 14/969,445

(22) Filed: Dec. 15, 2015

(65) Prior Publication Data
US 2017/0168763 A1 Jun. 15, 2017

(51) Int. Cl.
G06F 3/12 (2006.01)
H04N 1/00 (2006.01)
G06F 3/0484 (2013.01)

(52) U.S. Cl.
CPC ........ G06F 3/1253 (2013.01); G06F 3/04842 (2013.01); G06F 3/1205 (2013.01); H04N 1/00 (2013.01); H04N 1/0044 (2013.01); H04N 1/00411 (2013.01); H04N 2201/0081 (2013.01); H04N 2201/0094 (2013.01)

(58) Field of Classification Search
CPC .............................. H04N 5/378; G06F 3/1253
USPC ................................................ 358/1.15, 1.14
See application file for complete search history.

(56) References Cited

U.S. PATENT DOCUMENTS

| 2002/0154343 | A1* | 10/2002 | Chiu ...................... H04N 1/407 358/474 |
| 2005/0097475 | A1* | 5/2005 | Makioka ............... G06F 3/0481 715/792 |
| 2010/0192095 | A1* | 7/2010 | Ubillos .................. G06T 11/60 715/810 |
| 2011/0085188 | A1* | 4/2011 | Matsuoka ............ H04N 1/0035 358/1.9 |
| 2016/0080586 | A1* | 3/2016 | Koue ....................... H04N 1/04 358/448 |

FOREIGN PATENT DOCUMENTS

JP 08-265498 10/1996

* cited by examiner

Primary Examiner — Jacky X Zheng
(74) Attorney, Agent, or Firm — Amin, Turocy & Watson LLP

(57) ABSTRACT

According to an embodiment, an image reading apparatus comprises an acquisition section, a reading section, a storage section, a display section and a control section. The acquisition section acquires a plurality of mutual different setting values relating to an image. The reading section reads an image formed on a sheet. The storage section stores a plurality of image data respectively corresponding to the plurality of setting values of a document image read by the reading section. The display section preview-displays the plurality of image data stored in the storage section. The control section executes a designated processing with image data selected from the plurality of image data displayed on the display section.

8 Claims, 8 Drawing Sheets

IMAGE READING APPARATUS FOR READING IMAGES FORMED ON A SHEET

FIELD

Embodiments described herein relate generally to a technology which reads an image formed on a sheet.

BACKGROUND

Conventionally, in a case of executing a copy processing or a scan processing with an image forming apparatus, a user sets a parameter such as resolution, and then presses the start button. In this way, the image forming apparatus reads an image according to the parameter, forms the obtained image data on a sheet, converts the image data into file and then stores it in a storage area.

When setting the parameters, it is necessary for the user to imagine and set the image data obtained after the image is read according to an image of the document sheet. Further, after the image is read, it is also required to confirm whether or not the read image is the desired image. As a confirmation method, the user observes the preview-display on an operation panel, or prints the preview-display on the operation panel actually, or displays the image data obtained after the image is read on a monitor of a PC (Personal Computer).

If the confirmed read image is just the desired image, the image reading job can be ended. However, in a case in which a reading image different from the desired image is generated, the user carries out the setting of parameters serving as the initial step again. That is, the user carries out the same jobs repeatedly until the desired reading image is obtained. Further, during a period in which the same jobs are carried out repeatedly, unwanted image data, which will not be adopted, is also generated and stored. As long as the unwanted image data is not deleted, it will remain as it is and compress the storage area.

DETAILED DESCRIPTION

In accordance with an embodiment, an image reading apparatus comprises an acquisition section, a reading section, a storage section, a display section and a control section. The acquisition section acquires a plurality of setting values relating to an image that are different from each other. The reading section reads an image formed on a sheet. The storage section stores a plurality of image data respectively corresponding to the plurality of setting values of a document image read by the reading section. The display section preview-displays the plurality of image data stored in the storage section. The control section executes a designated processing with the image data selected from the plurality of image data displayed on the display section.

In the present embodiment, the user sets a plurality of parameters for the scan job or copy job before an image is read. The set parameter may be, for example, a reading resolution, a category of full color/grey scale and the like. The image forming apparatus of the embodiment executes an image processing on an image obtained by reading a document sheet for each setting value according to a plurality of setting values set by a user. For example, in a case in which the user sets three reading resolutions including 300 DPI, 400 DPI and 600 DPI, the image forming apparatus carries out image processing on the images obtained by scan operation so that each resolution of images becomes 300 DPI, 400 DPI and 600 DPI respectively, and then creates images respectively corresponding to the three resolutions.

After the image processing, the image forming apparatus preview-displays the created images on the operation panel. The operation panel switches and displays the images through, for example, user's operations. Alternatively, the obtained images may be displayed in a row or in a matrix shape. The user selects one desired image while comparing the displayed images. The image forming apparatus only takes the selected image as an effective reading image, and erases the other images to make the other images not be used by the user.

Hereinafter, the present embodiment is described with reference to the accompanying drawings.

Figure 1:
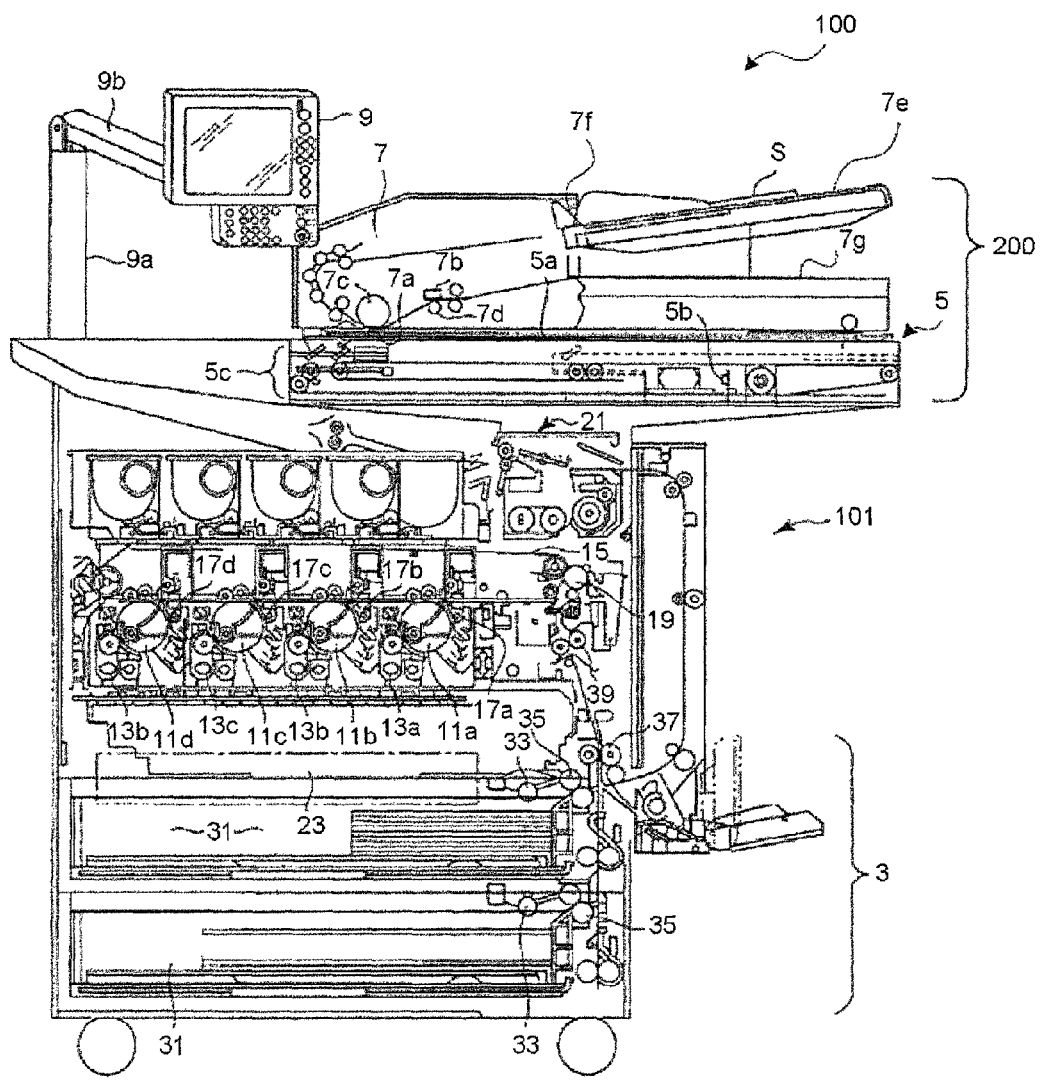
FIG. 1 is a diagram illustrating an example of the constitution of an image forming apparatus according to an embodiment.

FIG. 1 is a diagram illustrating an MFP (Multi-Functional Peripheral) serving as one form of an image forming apparatus. An image forming apparatus 100 shown in FIG. 1 includes an image forming section 101, a sheet feed section 3, and a scan unit 5. The image forming section 101 inputs image information, and forms and fixes a toner image on a normal paper or a transparent resin sheet. The sheet feed section 3 feeds sheet of any size used in an image output operation to the image forming section 101.

The scan unit 5 scans a document sheet and acquires image data. The scan unit 5 outputs the acquired image data to the image forming section 101, or outputs the acquired image data to a non-volatile storage section and stores it permanently.

The image forming apparatus 100 is provided with an automatic document feeder 7 which guides a document sheet to a reading position. The automatic document feeder 7 is arranged on a document table 5a of the scan unit 5, wherein the document table 5a is used to place document sheets. Further, an image reading section 200 (reading section) consists of the scan unit 5 and the automatic document feeder 7.

The image reading section 200 includes reading sensors 7a and 7b for converting image information of the document sheet into electric signals. The reading sensor 7a converts image information of a first side of a document sheet S into electric signals. The reading sensor 7b converts image information of a second side serving as an opposite side to the first side of the document sheet S into electric signals. Further, the first side is the front side of the document sheet S that is placed on a feed tray 7e, and the second side is the back side of the document sheet S placed on the feed tray 7e. Hereinafter, the first side is referred to as the front surface, and the second side is referred to as the back surface as needed.

A detection sensor 7f detects whether or not the document sheet S is placed on the feed tray 7e.

A white back guide 7c is arranged at an opposite position to the reading sensor 7a.

A white back guide 7d is arranged at an opposite position to the reading sensor 7b.

The automatic document feeder 7 sequentially conveys the sheet placed on the feed tray 7e to the reading sensor 7a and the reading sensor 7b, and discharges the sheet to a discharge tray 7g.

The scan unit 5 further includes a reading sensor 5b that is arranged below the document table 5a and at a given position inside the scan unit 5. The reading sensor 5b receives image information of the document on the document table 5a through an illumination system 5c.

The image forming apparatus 100 is provided with an operation panel 9. The operation panel 9, which is a touch panel display, receives an instruction to start the reading of the image information of the document by the scan unit 5 and an instruction to start an image formation operation of the image forming section 101 from a user. Further, the operation panel 9 also functions as an acquisition section for acquiring the values input by the user. The operation panel 9 further functions as a display section used to display progress or status of processing, message indicating a notification to the user, and the preview of an image. The operation panel 9 is arranged in the corner at the left side or the right side of the scan unit 5, and is supported by a strut 9a and a swing arm 9b that are fixed in the image forming section 101.

The image forming section 101 is provided with first-fourth photoconductive drums 11a~11d which are used to hold latent images. The image forming section 101 also includes developing devices 13a~13d which respectively supply toners in Y (yellow), M (magenta), C (cyan) and Bk (black) color to and develop the aforementioned toners on the photoconductive drums 11a~11d. The image forming section 101 includes a transfer belt 15 to which the toner images held on the photoconductive drums 11a~11d are sequentially transferred. The image forming section 101 further includes first-fourth cleaners 17a~17d which are used to remove the toners left on the photoconductive drums 11a~11d.

The image forming section 101 includes a transfer device 19 for transferring the toner images held on the transfer belt 15 to the sheet. The image forming section 101 includes a fixing device 21 which is used to fix the toner images transferred to the sheet by the transfer device 19 on the sheet. The image forming section 101 also includes an exposure device 23 which is used to form the latent images on the photoconductive drums 11a~11d.

The sheet feed section 3 is provided with a plurality of cassettes 31, and feeds the sheet to the transfer device 19 at given timings. The plurality of cassettes 31 can house sheets of any size. A pickup roller 33 takes out one sheet from a corresponding cassette 31 in response to an image forming operation.

A separation mechanism 35 prevents that more than two sheets are taken out from the pickup rollers 33.

A conveyance roller 37 conveys and sends the one separated sheet to an aligning roller 39. At timings when the transfer device 19 transfers the toner images on the transfer belt 15, the aligning roller 39 sends the sheet to a transfer position where the transfer device 19 is in contact with the transfer belt 15.

The fixing device 21 fixes the toner image corresponding to the image information to the sheet, and then sends the sheet to a stock section located at a space between the scan unit 5 and the image forming section 101.

Figure 2:
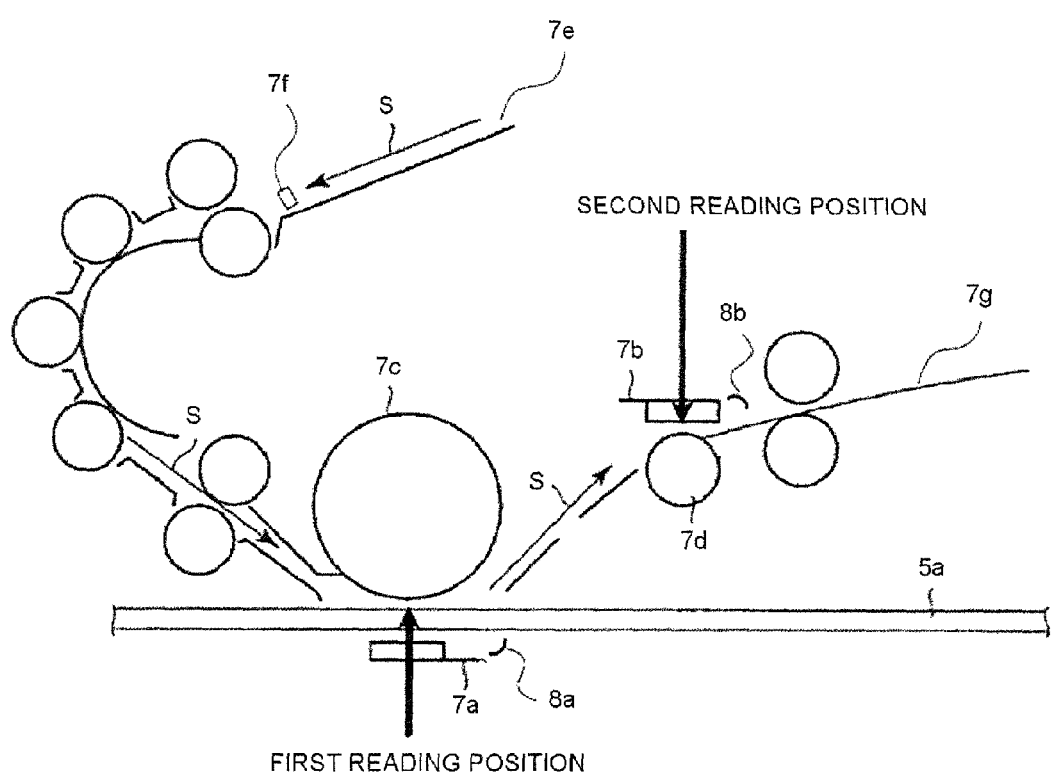
FIG. 2 is a diagram illustrating an example of the constitution of an image reading section according to the embodiment.

FIG. 2 is a diagram illustrating the neighborhood of the automatic document feeder 7 and the scan unit 5 shown in FIG. 1.

The document sheet S that moves towards the document table 5a of the scan unit 5 in an arrow direction is read by the reading sensor 7a at a first reading position facing the back guide 7c. The moving document sheet S is further read by the reading sensor 7b at a second reading position facing the back guide 7d.

An illumination mechanism 8a, which is used to provide light reflected by the back guide 7c or the document sheet S to the reading sensor 7a, is arranged nearby the back guide 7c.

An illumination mechanism 8b, which is used to provide light reflected by the back guide 7d or the document sheet S to the reading sensor 7b, is arranged nearby the back guide 7d.

As shown in FIG. 2, the front surface of the document sheet S is read by the reading sensor 7a, and then the back surface of the document sheet S is read by the reading sensor 7b. That is, the both sides (including the front surface and the back surface of the document sheet S) can be read only through once conveyance operation.

Figure 3:
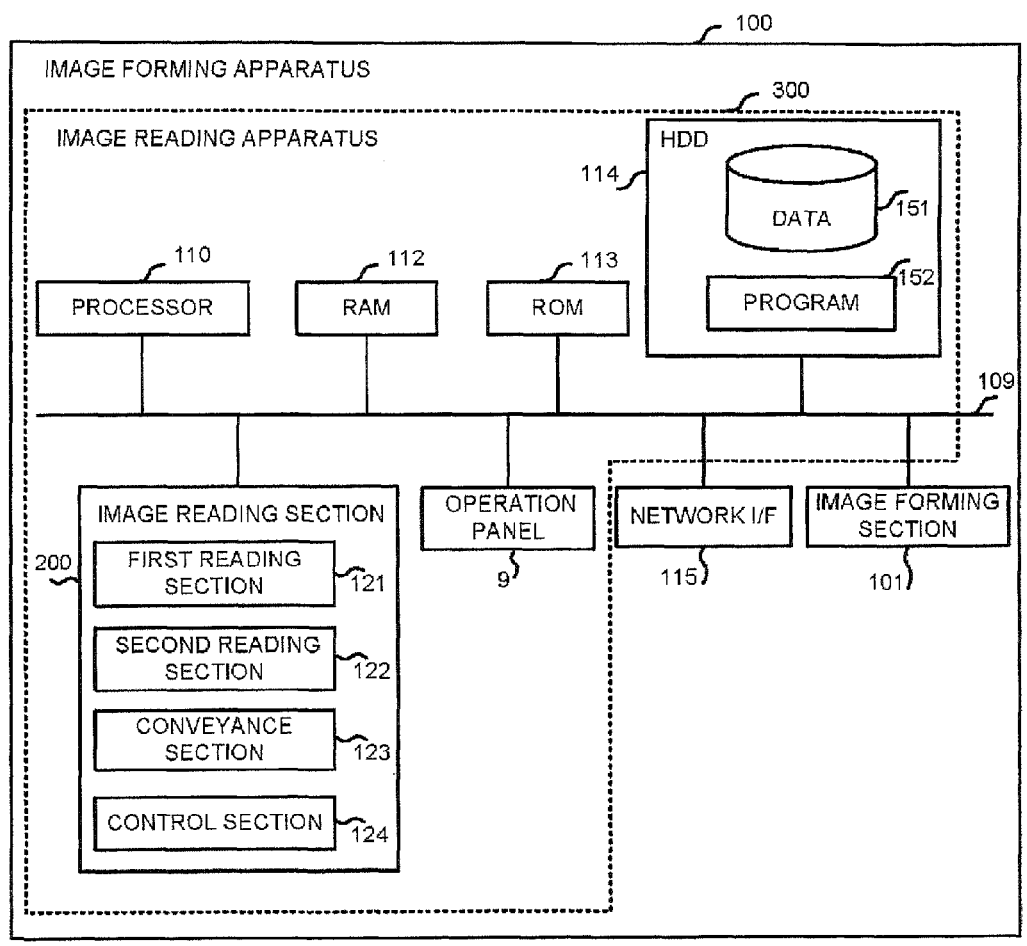
FIG. 3 is a block diagram illustrating an example of the constitution of the image forming apparatus according to the embodiment.

FIG. 3 is a block diagram illustrating the constitution of the image forming apparatus 100. The image forming apparatus 100 comprises a processor 110, a RAM (Random Access Memory) 112, a ROM (Read Only Memory) 113, an HDD (Hard Disk Drive) 114, the image forming section 101, a network I/F (Interface) 115, an operation panel 9 and the image reading section 200. Since the image forming section 101 and the operation panel 9 are described in FIG. 1, and therefore the descriptions thereof are not provided below.

The processor 110 is an arithmetic apparatus such as a CPU (Central Processing Unit). The processor 110 copies or decompresses and executes programs stored in the ROM 113 and a program 152 and data 151 stored in the HDD 114 in the RAM 112. In this way, the processor can cooperate with each piece of hardware and meanwhile provide various functions. The RAM 112 is a primary storage device, and the ROM 113 is a device in which system programs are stored in a nonvolatile manner.

The HDD 114 is an auxiliary storage device which is used to store the data 151 for controlling operations and the program 152 in a nonvolatile manner. The HDD 114 further stores the image data obtained after the scan processing temporarily or permanently.

The network I/F 115 is used to control the data communication with an external device.

The image reading section 200 consists of the scan unit 5 and the automatic document feeder 7. The image reading section 200 includes a first reading section 121, a second reading section 122, a conveyance section 123 and a control section 124.

The first reading section 121 has a constitution including the reading sensor 7a, and reads the front surface of the conveyed document sheet S. The second reading section 122 has a constitution including the reading sensor 7b, and reads the back surface of the conveyed document sheet S. The conveyance section 123 includes a plurality of roller pairs and a conveyance path. The conveyance section 123 conveys the document sheet S placed on the feed tray 7e to the first reading section 121, the second reading section 122 and the discharge tray 7g in order.

The control section 124 is a unit for controlling the reading timings of the first reading section 121 and the second reading section 122, and controlling the conveyance operation of the conveyance section 123. The control section 124 may carry out each control according to instructions from the processor 110, or may also carry out each control by itself without instructions from the processor 110. Though it is assumed that the control section 124 is installed with an ASIC (application specific integrated circuit), it may also be an installation of a program control including a CPU, a memory and the like.

Though it is assumed in the present embodiment that the image data obtained after the scan processing is stored in the HDD 114 or the RAM 112, the control section 124 may be provided with a volatile or nonvolatile storage section, and the aforementioned image data may be stored in this storage section.

Figure 4:
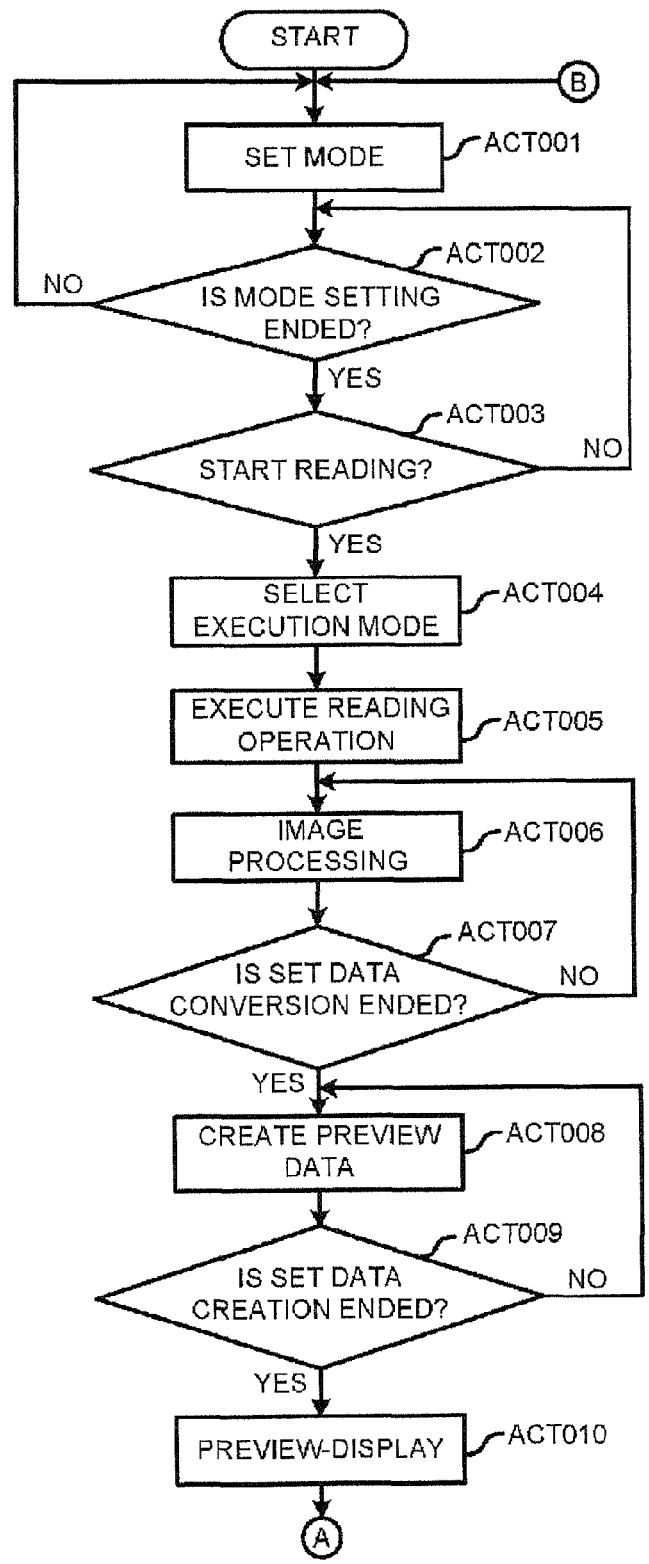
FIG. 4 is a flowchart illustrating an example of operations according to the embodiment.
Figure 5:
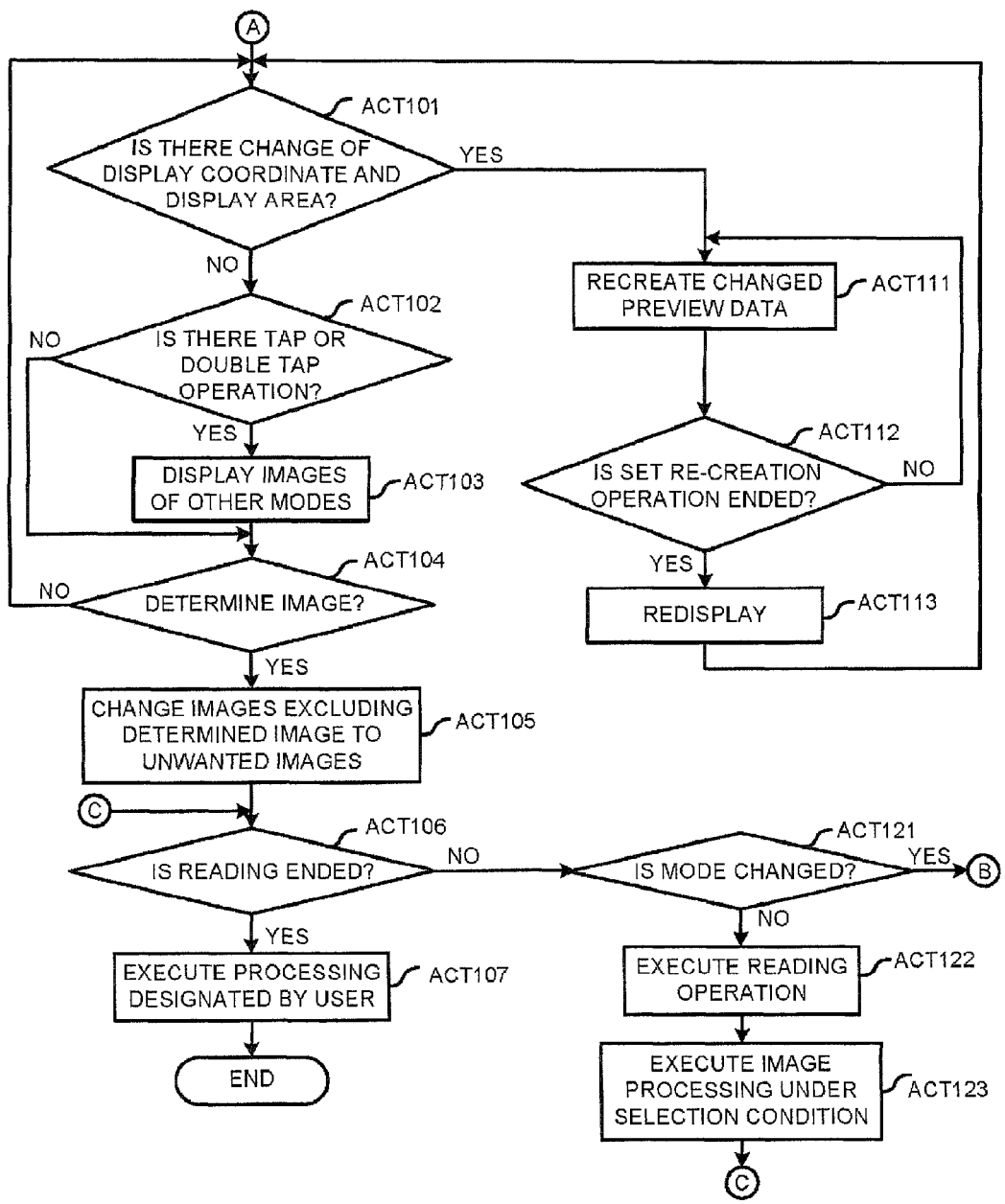
FIG. 5 is a flowchart illustrating an example of operations according to the embodiment.

FIG. 4 and FIG. 5 are flowcharts illustrating examples of operations when the image reading section 200 carries out scan operations. The operations in the flowchart shown in FIG. 4 are carried out by the processor 110 of the image forming apparatus 100. That is, the processor 110 of the image forming apparatus 100 operates according to the codes of the program 152 to gives instructions to the control section 124. In this way, the operations in the flowchart shown in FIG. 4 are executed. Further, when there is no instruction from the processor 110, the control section 124 of the image reading section 200 may also execute the operations in the flowcharts shown in FIG. 4 and FIG. 5 according to the control by the circuit of the control section 124 or a program control. That is, the operations in the flowcharts shown in FIG. 4 and FIG. 5 may also be carried out by the control section 124.

Before a document image is read by the image forming apparatus 100, the user sets parameters (setting values) at the time of reading image through the operation panel 9 (ACT 001). In the present embodiment, as an example, the category of full color/grey scale and a resolution (including 300 DPI, 400 DPI, and 600 DPI) are taken as setting items. Further, in the present embodiment, it is possible to combine the parameters and perform a plurality of additional settings. The combination of the parameters is referred to as a mode. In this example, it is assumed in ACT 001 that three modes including a grey scale 600 DPI, a grey scale 400 DPI and a grey scale 300 DPI are additionally set.

When the setting of modes is ended (YES in ACT 002), the processor 110 determines whether or not an instruction to start image reading is received (ACT 003). The processor 110 carries out the determination based on whether or not a start button of the operation panel 9 is pressed.

If an instruction to start the image reading is received (YES in ACT 003), the processor 110 selects a mode in which the reading processing is carried out actually based on the set image reading modes (ACT 004). The mode selected in ACT 004 is a mode in which the images of all the reading modes designated by the user can be generated. For example, when the document image is read in a full color, it is possible to generate a grey scale image according to the obtained image, but it is not possible to generate a full-color image when the document image is read in a grey scale. Further, though it is possible to generate an image having lower resolution equivalent to 400 DPI or 300 DPI according to the obtained image when the document image is read in 600 DPI, it is necessary to carry out a data interpolation to obtain an image having higher (detailed) resolution equivalent to 600 DPI when the document image is read in 400 DPI or 300 DPI. In this example, the document image is read in the full color and 600 DPI to obtain the images corresponding to all modes set in ACT 001 (ACT 005). Further, in this case, since all modes are grey scale, the reading processing is carried out in the grey scale. Herein, the front surface and the back surface of one sheet are read, and the read images are stored in the RAM 112 temporarily. That is, the under-mentioned operations will be executed on each sheet.

The processor 110 creates images of various modes designated by the user according to the image obtained in the reading operation (loop of ACT 006 and NO in ACT 007). In this example, the processor 110 converts the DPI of the reading image obtained in a mode of full color and 600 DPI to generate a 600 DPI image, a 400 DPI image and a 300 DPI image in grey scale corresponding to the set mode. The processor 110 first stores the generated image data in association with the image data read in the mode of full color and 600 DPI in the RAM 112.

When the image processing in each mode is ended, and the images obtained in all modes corresponding to the document image are stored in the RAM 112 (YES in ACT 007), the processor 110 generates preview images respectively corresponding to the image data stored in the RAM 112 (loop of ACT 8 and NO in ACT 009). When the creation of the preview images is completed (YES in ACT 009), the processor 110 displays these preview images on the operation panel 9 (ACT 010).

Figure 6:
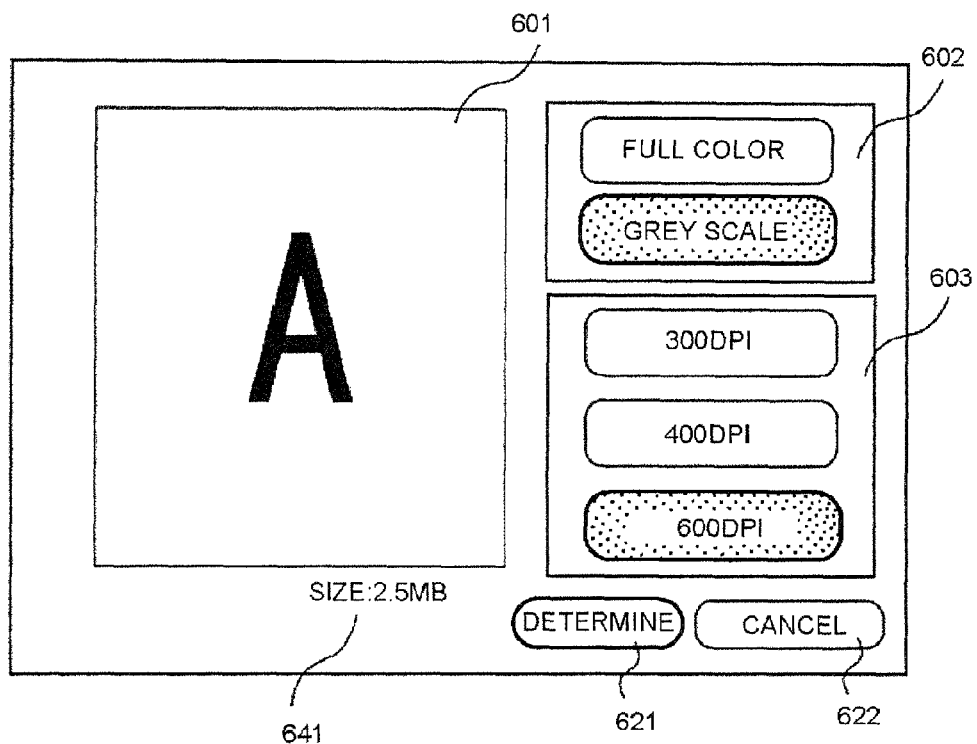
FIG. 6 is a diagram illustrating an example of display on an operation panel.

FIG. 6 illustrates an example of display of the operation panel 9. The operation panel 9 displays the preview image in an area 601. The set category (full color/grey scale) is displayed in an area 602 with hatching, and the set resolution is displayed in an area 603 with hatching. The operation panel 9 switches and displays the preview image and the setting item corresponding to the selected mode. In this way, it is possible for the user to determine a desired image while comparing the images. Further, since the data size of each image is also one selection element, a data size (file size) is displayed in an area 641. In addition, in a case of processing multiple sheets in one job, correct data size cannot be obtained unless the image processing is carried out on all sheets. Thus, when the image processing cannot be carried out on all sheets, the operation panel 9 displays a data size of a sheet to which the image processing is carried out halfway, or displays a predicted data size, or displays a total value after the processing is carried out on all sheets.

The area 601 receives gestures such as a tap/double tap operation, a flick operation, a pinch in/pinch out operation and the like of the user. In the pinch in/pinch out operation, the operation panel 9 displays a reduced/enlarged image that takes a contact position as a center, and a display part slides and moves when receiving a flick operation in the vertical direction or in the horizontal direction at the time of displaying an enlarged image. Further, when the flick operation in the vertical direction or in the horizontal direction is received at the time of displaying an entire image, the next page and the last page are displayed.

By carrying out a tap or double-tap operation on the area 601, the images in other modes may be displayed. In this case, the hatching state of each button (a hatching indicating which button is selected) in the area 602 and the area 603 is switched to a state corresponding to the display image according to the switch of the image.

Further, in the above description, the reduction/enlargement/slide of image, the page switch of image, the image display switch in other mode and the like are carried out through the gesture, and the aforementioned switch operation can be also carried out by arranging and pressing each setting key/button.

Then, the flowchart is described with reference to FIG. 5. If a gesture like above is carried out, and a display coordinate and a display area are changed (YES in ACT 101), the processor 110 creates preview data consistent with the changed display coordinate and the display area again (ACT 111). The processor 110 uses the image data obtained in ACT 006 to create the preview data of all modes again (loop of NO in ACT 112).

When the preview data of all modes is created again (YES in ACT 112), the processor 110 enables the operation panel 9 to operate to display the re-created preview data (ACT 113), and then returns to carry out the processing in ACT 101 again. By making the processing return to ACT 101, a re-creation operation and a re-display operation are carried out every time the user changes the coordinate and area.

Figure 7:
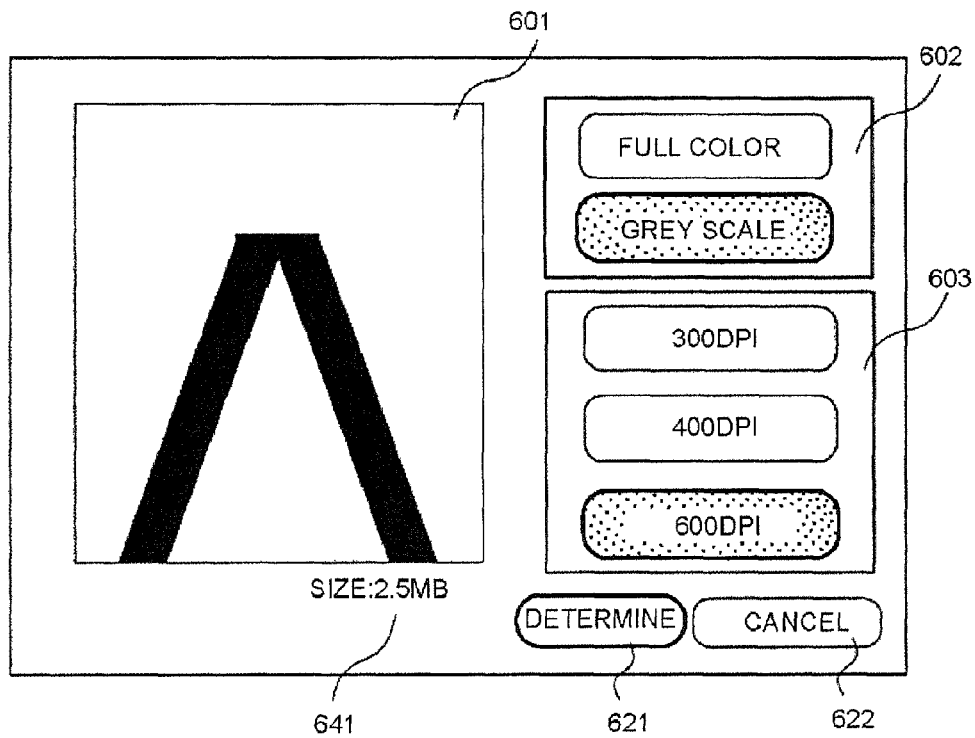
FIG. 7 is a diagram illustrating an example of display on the operation panel when part of an image is displayed in an enlarged state (select 600 DPI)
Figure 8:
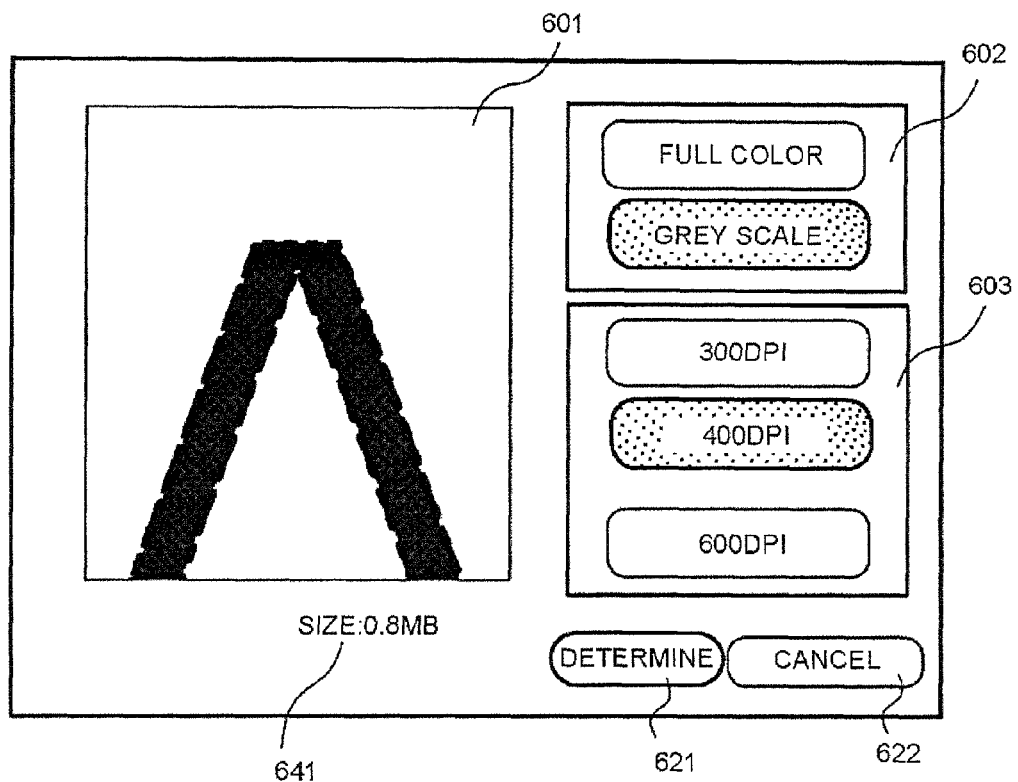
FIG. 8 is a diagram illustrating an example of display on the operation panel when part of an image is displayed in an enlarged state (select 400 DPI)

Then, if there is no change of the display coordinate and display area (NO in ACT 101), and a tap or double-tap operation is carried out on the area 601, the current image is switched to an image in other mode and such a new image is displayed (ACT 103). Herein, the processor 110 displays the image in other mode at a display coordinate and a display area, wherein this display coordinate and this display area coincide with the display coordinate and display area of the image that has been displayed so far. This display operation is described with reference to FIG. 7 and FIG. 8. FIG. 7 illustrates a state in which the upper part of "A" is enlarged and displayed with respect to the preview-display shown in FIG. 6. If a tap operation or a double-tap operation is carried out on the area 601 in the display state in FIG. 7, a 400 DPI image (an image thicker than a 600 DPI image) in a display state in FIG. 8, that is, in a state in which the upper part of "A" is enlarged and displayed is displayed. In this way, the processor 110 controls to display same part at the same rate before and after switch operation at the time of enlarging and displaying an image. Consequently, the user can confirm the difference of image quality even for details of an image. The user selects a desired image while comparing the images and checking the details. The user also determines an image considered to be the best while confirming the data size.

Return to the description in FIG. 5, if a determine button 621 is pressed in a state in which the user's desired image is displayed (YES in ACT 104), the processor 110 changes the images other than the determined image to be unwanted images such as canceling them from the RAM 112 (ACT 105).

By determining whether or not a signal from the detection sensor 7f is being outputted, the processor 110 determines whether or not the reading operation of all sheets is ended (ACT 106). In a case in which the reading operation of all sheets is completed (YES in ACT 106), the processor 110 executes a job processing designated by the user with the image data left finally (ACT 107). If the processing designated by the user is a processing of a copy job, the processor 110 enables the image forming section 101 to operate to form an image with the image data left finally. If the processing designated by the user is a processing of a scan job, the processor 110 stores the image data left finally in the HDD 114 or in a designated server permanently. Further, the processor 110 may attach the image data left finally to a mail, and then send it to an external device through the network I/F 115. Furthermore, the image data left finally may be sent through FAX.

In a case in which the reading operation of all sheets is not completed yet (NO in ACT 106), the processor 110 inquires the user of whether to change the designated mode through the operation panel 9 (ACT 121). Herein, the processor 110 inquires the user whether to set a resolution different from that of the sheets processed before. If a mode change is received (YES in ACT 121), the processor 110 returns to carry out the processing in ACT 001 and a mode setting processing is carried out again. In a case in which another mode identical to the former mode is reselected from the designated modes, it is not required to return to the processing in ACT 001, and thus the processing may return to, for example, ACT 005 in this case. Through the operation returning to ACT 001 (or ACT 005) when the result of determination in ACT 121 is Yes, the user can confirm the reading image on each sheet and in each page, and can obtain an image in a mode considered as the most suitable to one sheet and one page.

On the other hand, in a case in which the mode change is not received (NO in ACT 121), the processor 110 operates the image reading section 200 to execute reading operation on next sheet (ACT 122). The processor 110 executes an image processing on the read image data according to the mode selected and determined in ACT 104 (ACT 123). Then the processor 110 returns to carry out the processing in ACT 106.

Further, whether to carry out the determination in ACT 121 can be defined by the user in advance. In a case of not carrying out the determination in ACT 121, the processing proceeds to ACT 112 after the result of the determination in ACT 106 is No. Through this operation, when the document image is in a plurality of pages, as long as a reading image setting is determined using the reading image only in the initial page, the reading images in pages in and after the second page are processed in the same image reading mode. That is, the user may select a mode only for the initial one page. Further, in this case, since the user's desired mode has been determined, the reading operations in the determined mode may be carried out during the reading process but not generate the reading images in and after the second page in the image processing.

Figure 9:
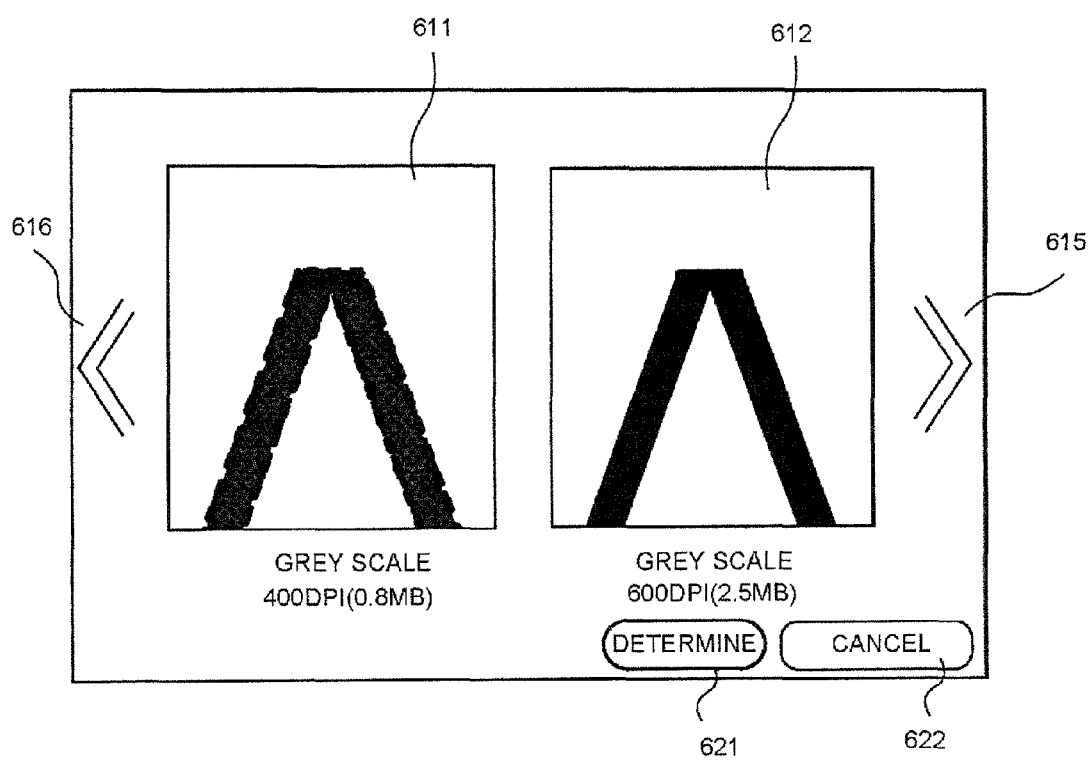
FIG. 9 is a diagram illustrating another example of display on the operation panel.

FIG. 9 is a diagram illustrating another example of display in the operation panel 9. In the example shown in FIG. 9, the images generated in different modes are arranged in a row in the horizontal direction.

The operation panel 9 displays the images in all modes respectively in an area 611 and an area 612. The operation panel 9 respectively displays a text in a part below each of the area 611 and the area 612 to make the user understand that the image is an image generated in which mode. Similar to the example of screen shown in FIG. 6 described above, all gestures are also received in the area 611 and the area 612. The processor 110 controls in such a manner that when the gestures such as enlargement/reduction, slide movement of display area and the like are carried out on one area, the other area also interlock with and follow these performed gestures in the one area, and thus the gestures such as enlargement/reduction, slide movement of display area and the like are carried out on the other area. In this way, the same part is always displayed in each area. In a case in which images of all modes cannot be displayed due to the limit of the display area, the processor 110 detects the press of an arrow 615 and an arrow 616 to enable the area 611 and the area 612 to slide and move in the horizontal direction, and then to display the mode images that is not displayed. In this way, the images in different modes are displayed simultaneously, and thus it is easier to perform a comparison operation. The user selects either one of the area 611 and the area 612 and then presses the determination button 621.

Though the image processing is carried out only by differing in the resolution in this example, it is also possible to carry out the image processing by mixing and combining the full color, monochrome, grey scale and the like.

In the present embodiment, it is described that the images in different modes such as 300 DPI, 400 DPI and the like are generated after the two sides of sheet are read, and the images of all modes are created by carrying out image processing in the example described above. However, the present invention is not limited to this. The automatic document feeder 7 of the present embodiment reads the two sides of sheet in once conveyance operation, but there is also an automatic document feeder which can only read one side of sheet in once conveyance operation. Such an automatic document feeder is equipped with a mechanism such as a reverse conveyance path, and can carry out the following operations with this reverse conveyance path to generate images of different modes at the time of reading operations.

In the automatic document feeder equipped with the reverse conveyance path, the first side of one sheet is read, and then the second side opposite to the first side is read after passing through the reverse conveyance path. After the second side of the sheet is read, the automatic document feeder enables the sheet to pass through the reverse conveyance path again, and thus it is possible to read the previous first side again. By repeating the reverse operation, the same side of the same sheet may be read for many times. When using the automatic document feeder that is equipped with the reverse conveyance path, the processor 110 controls to read the first side of the sheet at a resolution of 600 DPI at the time of the first-time conveyance, then controls to convey the sheet through the reverse conveyance path two times, and controls to read the same first side of the sheet respectively at the resolutions of 400 DPI and 300 DPI. In this way, it is possible to obtain images of different modes respectively at the resolutions of 600 DPI, 400 DPI and 300 DPI.

Further, the operations of the operation panel 9 and the processor 110 may be executed by, for example, a personal computer and the like. That is, the user operates using the keyboard, mouse and monitor of the personal computer, and the operations of the image processing may be carried out by a CPU of the personal computer. At this time, the image data and the like may be stored in a RAM and an HDD of the personal computer.

Though it is exemplified in the present embodiment that the image forming apparatus 100 includes the image reading apparatus 300, and the image reading apparatus 300 is incorporated into the image forming apparatus 100, the image reading apparatus 300 may also be a single and independent apparatus.

In the embodiment, though it is described that functions of executing the foregoing forms are pre-stored inside the apparatus, the present invention is not limited to this, and the same may be downloaded in the apparatus from a network or a device for enabling a recording medium to store the same functions may be installed in the apparatus. The form of the recording medium may be any form as long as the recording medium can store programs such as CD-ROM and can be read by the apparatus. In this way, the functions obtained by the installation process and the downloading process in advance may be realized by cooperating with OS (Operating System) inside the apparatus.

According to the form of the present embodiment, the user can obtain an image under a desired optimum setting condition.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. An image reading apparatus, comprising:
   a processor; and
   a memory that stores executable instructions that, when executed by the processor, performs operations, comprising:
   acquiring a plurality of resolutions relating to an image;
   reading an image formed on a sheet;
   storing, to a storage device, a plurality of image data respectively corresponding to the plurality of resolutions of a document image read from the image formed on the sheet;
   preview-displaying the plurality of image data stored in the storage device;
   in a case in which a first image having a first resolution serving as one image data among the plurality of image data is enlarged and displayed, enlarging and displaying other images having other resolutions which show a partial area of the first image at a same rate as the first image, and displaying the same parts of other images as a displayed part of the first image; and
   executing a designated processing with image data selected from the plurality of image data displayed in the preview-displaying;
   wherein the operations further comprise in a case in which a display part of the first image is moved and other part thereof is displayed, displaying other parts of other images.

2. The image reading apparatus according to claim 1, wherein the operations further comprise carrying out an image processing on the data of document image read from the image formed on the sheet to create the plurality of image data and store them in the storage device.

3. The image reading apparatus according to claim 1, wherein the operations further comprise, for each of the plurality of resolutions, reading an image with a resolution, and enabling the storage device to store each of the images read.

4. The image reading apparatus according to claim 1, wherein the operations further comprise displaying data size of each image data in association with the plurality of image data.

5. The image reading apparatus according to claim 1, wherein the operations further comprise when carrying out the designated processing on a plurality of sheets, processing the image data after the image data initially selected with a resolution of the image data initially selected.

6. The image reading apparatus according to claim 1, further comprising a display configured to detect an input operation performed to a surface from a user,
   wherein the operations comprising:
   preview-displaying the plurality of image data on the display;

detecting an operation touching area displaying the first image to enlarge the first image having the first resolution; and enlarging and displaying other images having the other resolutions which show the partial area of the first image.

7. An image reading method, including:

acquiring, by a device comprising a processor, a plurality of resolutions relating to an image;

reading, by the device, an image formed on a sheet;

storing, by the device, a plurality of image data respectively corresponding to the plurality of resolutions of a read document image in a storage section;

preview-displaying, by the device, a plurality of image data stored in the storage section;

in a case in which a first image having a first resolution serving as one image data among the plurality of image data is enlarged and displayed, enlarging and displaying other images having other resolutions which show a partial area of the first image at a same rate as the first image, and displaying the same parts of other images in a displayed part of the first image;

executing, by the device, a designated processing with image data selected from the plurality of image data displayed; and in a case in which a display part of the first image is moved and other part thereof is displayed, displaying, by the device, other parts of other images.

8. An image reading apparatus, comprising:

a processor; and a memory that stores executable instructions that, when executed by the processor, performs operations, comprising:

acquiring a plurality of values indicating color or grayscale relating to an image;

reading an image formed on a sheet;

storing, to a storage device, a plurality of image data respectively corresponding to the plurality of values indicating color or grayscale of a document image read from the image formed on the sheet;

preview-displaying the plurality of image data stored in the storage device;

in a case in which a first image having a first value indicating color or grayscale serving as one image data among the plurality of image data is enlarged and displayed, enlarging and displaying other images having other values indicating color or grayscale which show a partial area of the first image at a same rate as the first image, and displaying the same parts of other images as a displayed part of the first image; and executing a designated processing with image data selected from the plurality of image data displayed in the preview-displaying;

wherein the operations further comprise in a case in which a display part of the first image is moved and other part thereof is displayed, displaying other parts of other images.

* * * * *